(12) United States Patent
Combs et al.

(10) Patent No.: US 7,771,057 B2
(45) Date of Patent: Aug. 10, 2010

(54) PERIPHERAL WITH PROJECTION DISPLAY

(75) Inventors: James Lee Combs, Lexington, KY (US); William Henry Reed, Lexington, KY (US); Maini Helena Williams, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 283 days.

(21) Appl. No.: 11/864,172

(22) Filed: Sep. 28, 2007

(65) Prior Publication Data
US 2009/0086173 A1   Apr. 2, 2009

(51) Int. Cl.
*G03B 21/14* (2006.01)
(52) U.S. Cl. .................... 353/119; 353/122; 347/2; 347/3; 347/224; 347/239; 347/255; 347/241; 347/256

(58) Field of Classification Search .............. 347/2, 347/3, 239, 255, 224, 241, 256; 353/119, 353/122
See application file for complete search history.

(56) References Cited

U.S. PATENT DOCUMENTS

| | | | | |
|---|---|---|---|---|
| 4,972,496 A | * | 11/1990 | Sklarew | 382/187 |
| 6,799,853 B2 | * | 10/2004 | Silverbrook et al. | 353/122 |
| 2006/0126128 A1 | | 6/2006 | Ahmed et al. | |
| 2007/0013873 A9 | * | 1/2007 | Jacobson et al. | 353/30 |

* cited by examiner

*Primary Examiner*—Georgia Y Epps
*Assistant Examiner*—Sultan Chowdhury (57) ABSTRACT

A device for projection of an operations panel includes a printer portion, a media feedpath extending through the printer portion having a media input and a media output, an image projector forming an image on one of the media input or an image receiving surface, the image projector defining an operations panel for making operation selections.

30 Claims, 10 Drawing Sheets

PERIPHERAL WITH PROJECTION DISPLAY

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to peripheral devices and more specifically, to peripherals having projection displays which function as operations panels.

2. Description of the Related Art

Peripheral devices have become more functional over time. Initially these devices were merely single function devices, such as printers. However, additional functionality has been incorporated into relatively small housings allowing multi-function peripheral devices, capable of performing scanning, printing, copying, faxing and other functions, to be utilized commercially in the home and in home offices.

As additional functionality has been incorporated into these devices, control complexity has needed to increase. For example, early peripheral devices merely utilized hard function buttons allowing limited selection capability. However, more recently manufacturers have utilized display screens within peripheral devices for making menu selections and, for example, viewing images, selection and editing of images prior to printing. Users have enjoyed the increased capabilities associated with these larger operations panels but have desired larger screens for more improved functionality. Manufacturers unfortunately are generally limited with respect to display screen size by the housing size and the costs associated with larger displays.

It would be desirable if the larger displays were available for users to operate peripheral devices and therefore allows for additional functionality.

SUMMARY OF THE INVENTION

A device for projection of an operations panel comprises a printer portion, a media feedpath extending through the printer portion having a media input and a media output an image projector forming an image on one of the media input or an image receiving surface, the image projector defining an operations panel for making operation selections. An image receiving surface is spaced from the device. The device may be a stand-alone device or may be connected to a host computer. The device may be a single function peripheral or may be a multi-function peripheral. The image receiving surface is pivotably connected to the device. The device may further comprise a front projection image projector or a rear projection image projector. The image projector may be a liquid crystal on silicon display. The image projector may be moveable from a first stored position to a second operating position. The operations panel includes a touch panel input device wherein the input device comprises a transducer for propagating waves along the image receiving surface or the device comprises a resistive layer on the image receiving surface.

An apparatus comprises a printer portion, an image projector mounted to the apparatus and, an operator input device positioned on a display screen and for use with the image projector. The image projector may be movable from a first stored position to a second operating position. The apparatus further comprises a pivotable image display screen. The apparatus further comprises virtual buttons for providing input on a screen. The apparatus further comprises a transducer to allow input on the image display screen. The image projector may be a rear projection display or a front projection display, a monochrome projector, a color projector or may be capable of both color and monochrome projection. The apparatus may be a stand-alone apparatus. The apparatus is a single function apparatus. The apparatus may be an all-in-one apparatus.

A device comprises a printer, a projection engine projecting a display, the display including an operations panel allowing at least one of menu selections and image editing, the display being projected on one of an input media stack, a display surface adjacent the device or a display screen disposed on the device. The projection engine is a rear projection projector. The projection engine may be a DLP projector or may be a LCoS projector. The device further comprises a projection assembly having a projection door which may be raised or lowered.

BRIEF DESCRIPTION OF THE DRAWINGS

The above-mentioned and other features and advantages of this invention, and
the manner of attaining them, will become more apparent and the invention will be better understood by reference to the following description of embodiments of the invention taken in conjunction with the accompanying drawings, wherein.

DETAILED DESCRIPTION

The following description and drawings illustrate embodiments of the invention sufficiently to enable those skilled in the art to practice it. It is to be understood that the invention is not limited in its application to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiment may be included in or substituted for those of others. The scope of the invention encompasses the appended claims and all available equivalents. The following description is, therefore, not to be taken in a limited sense, and the scope of the present invention as defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

The term image as used herein encompasses any printed or digital form of text, graphic, or combination thereof. The term output as used herein encompasses output from any printing device such as color and black-and-white copiers, color and black-and-white printers, and so-called "all-in-one devices" that incorporate two or more functions such as scanning, copying, printing, and faxing capabilities in one device. Such printing devices may utilize ink jet, dot matrix, dye sublimation, laser, and any other suitable print formats. The term button as used herein means any component, whether a physical component or graphic user interface icon, that is engaged to initiate output. The term media and paper may be used interchangeably herein and may include plain paper, glossy photo paper, coated paper, card stock, index cards, labels, envelopes, transparency, Mylar, fabric, or other printable materials. The term print engine, as used herein, means the at least one media feed assembly but may also include the carrier assembly and the base tray component in combination. The term operations panel, as used herein, means an interactive display allowing for menu display, menu selections, image viewing, editing of images, correction of error conditions and other operations and control functions. The term peripheral may include a single function or multi-function, or all-in-one, device which may be connected to a host computer, network connected or may be a stand-alone, which is a device which may function independently of any host computer.

Figure 1:
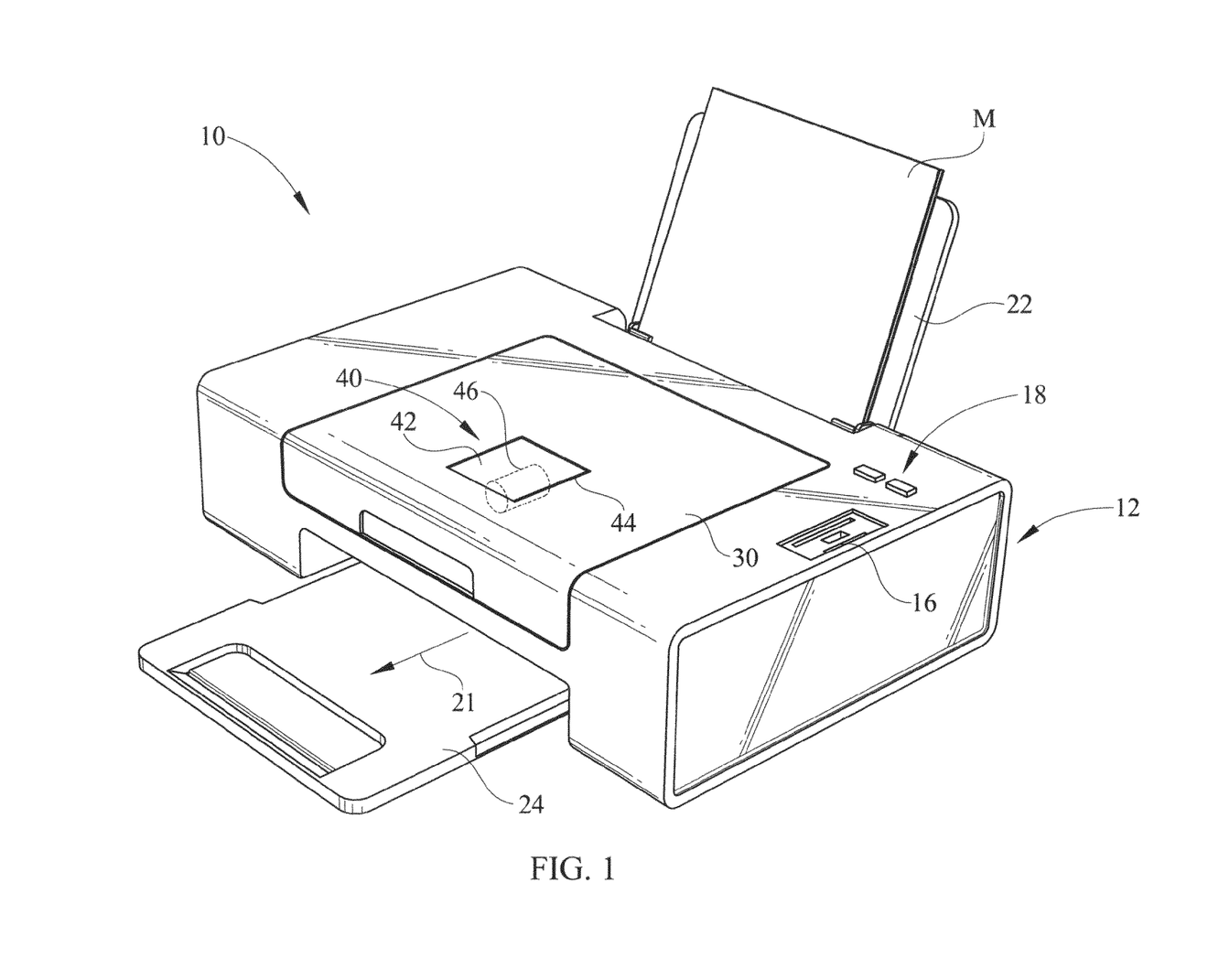
FIG. 1 depicts a peripheral device with a projection engine in perspective view.

The exemplary embodiments described herein utilize a projection display with a peripheral device to define an operations panel which may be preferable for viewing and editing of menus and images prior to printing. Referring initially to FIG. 1, a single function print peripheral 10 is depicted in a perspective view. Although a single function printer is depicted and described herein, the various embodiments of the projection device may be utilized with a single function device such as a copier, scanner, fax, a media card reader, or an all-in-one device, a photo kiosk or the like, any of which may further comprise stand-alone capability. The peripheral 10 comprises a housing 12 within which a print engine 20 is positioned. A projection engine 46 is shown in broken line beneath an upper surface of the housing 12. The projection engine 46 allows display of an operations panel on either media or a display surface connected to or adjacent to the peripheral 10.

Figure 2:
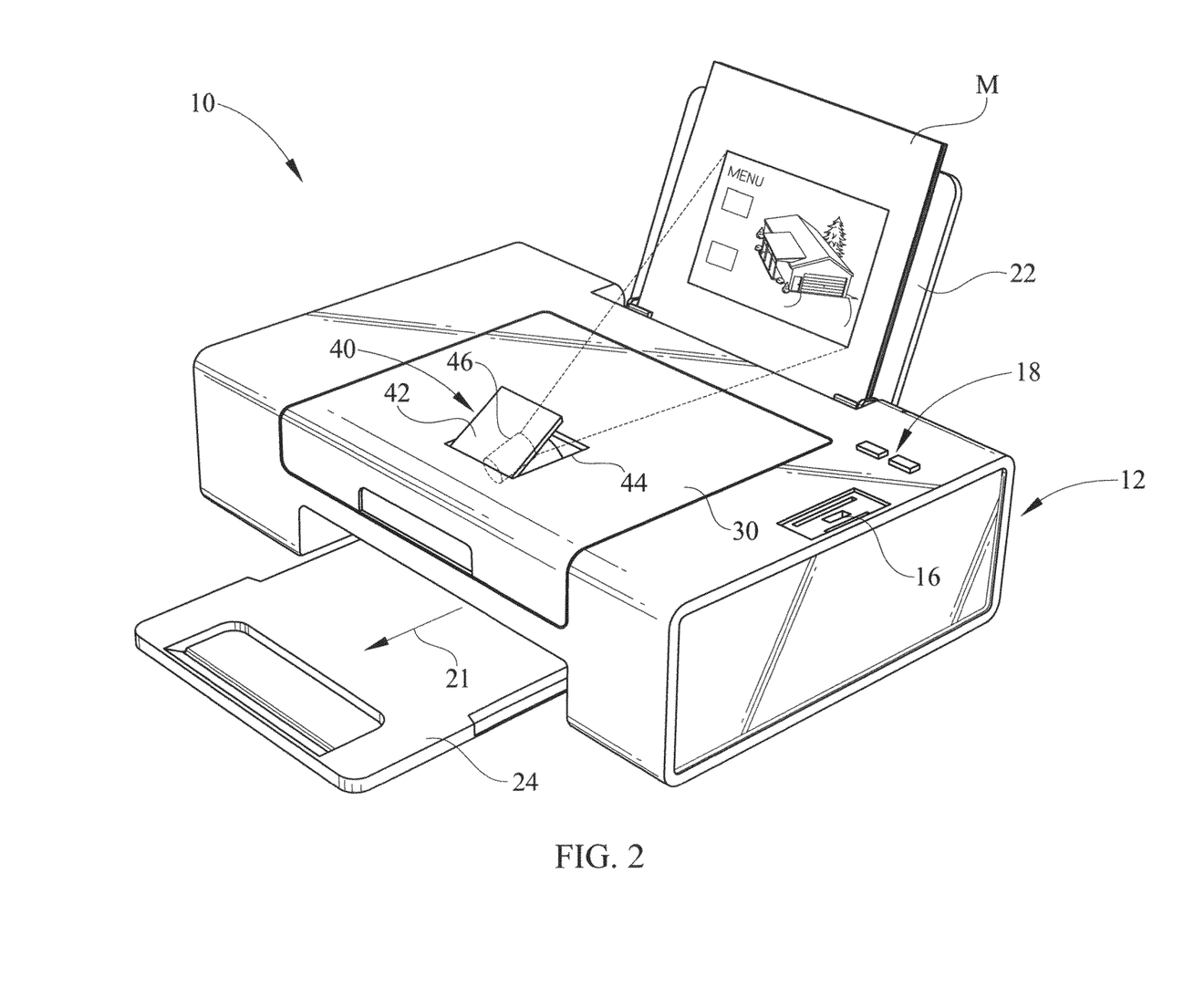
FIG. 2 depicts the peripheral device of FIG. 1 with the projection engine in the operating position.

Referring now to FIGS. 1-2, on the upper surface of the housing 12 is an access door 30 which allows access to a carrier assembly 30 allowing changing of the print cartridges. Adjacent the access door 30 are control buttons 18, which generally define a control panel. Within the housing 12 may be a controller 70 (FIG. 4a, 4b) which may receive data communication from a host computer PC (FIG. 4a, 4b) connected to the peripheral device 10. The controller 70 may be embodied by a micro-processor and controls the various functions of the peripheral 10. Likewise, the controller 70 provides outputs to signal a user of messages, menu selections, error conditions and the like either audibly or visually, or both. Communication between the peripheral 10 and a computer or network may be provided by, for example, a parallel cable, a serial cable, a USB cable or via a network connection, either wired or wireless. The computer may be embodied in various forms including desktop computer, laptop, microcomputer, mobile phone, PC Phone, PALM device or the like. And, although the specific devices are listed, it should be understood that new computing classes and devices are continually being developed and are well within the scope of the present invention. The buttons 18 provide a means for inputting selections, correcting error conditions and the like and are in electronic communication with the controller 70.

Figure 4A:
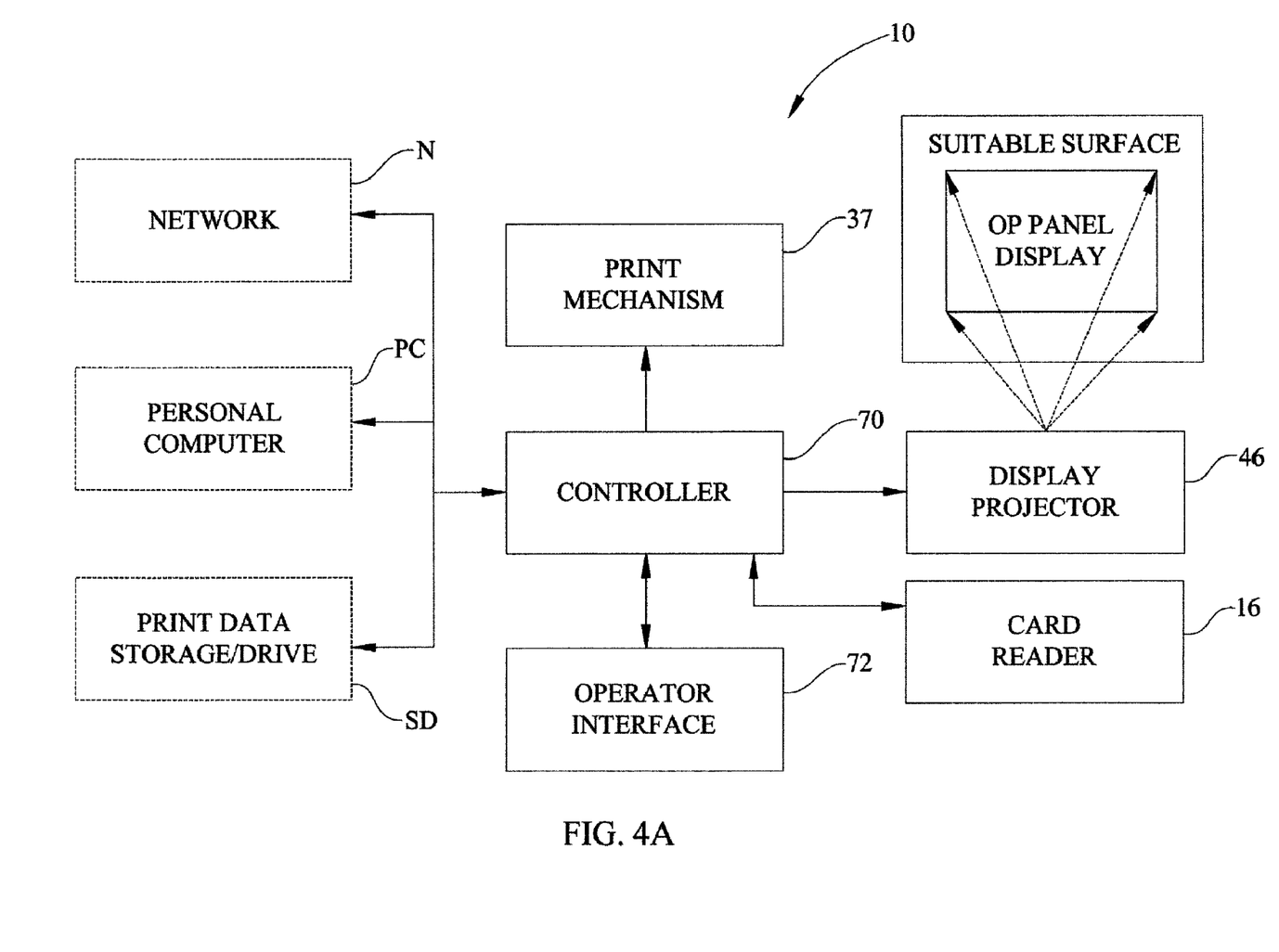
FIG. 4a depicts a schematic diagram of the peripheral device of FIG. 1.
Figure 4B:
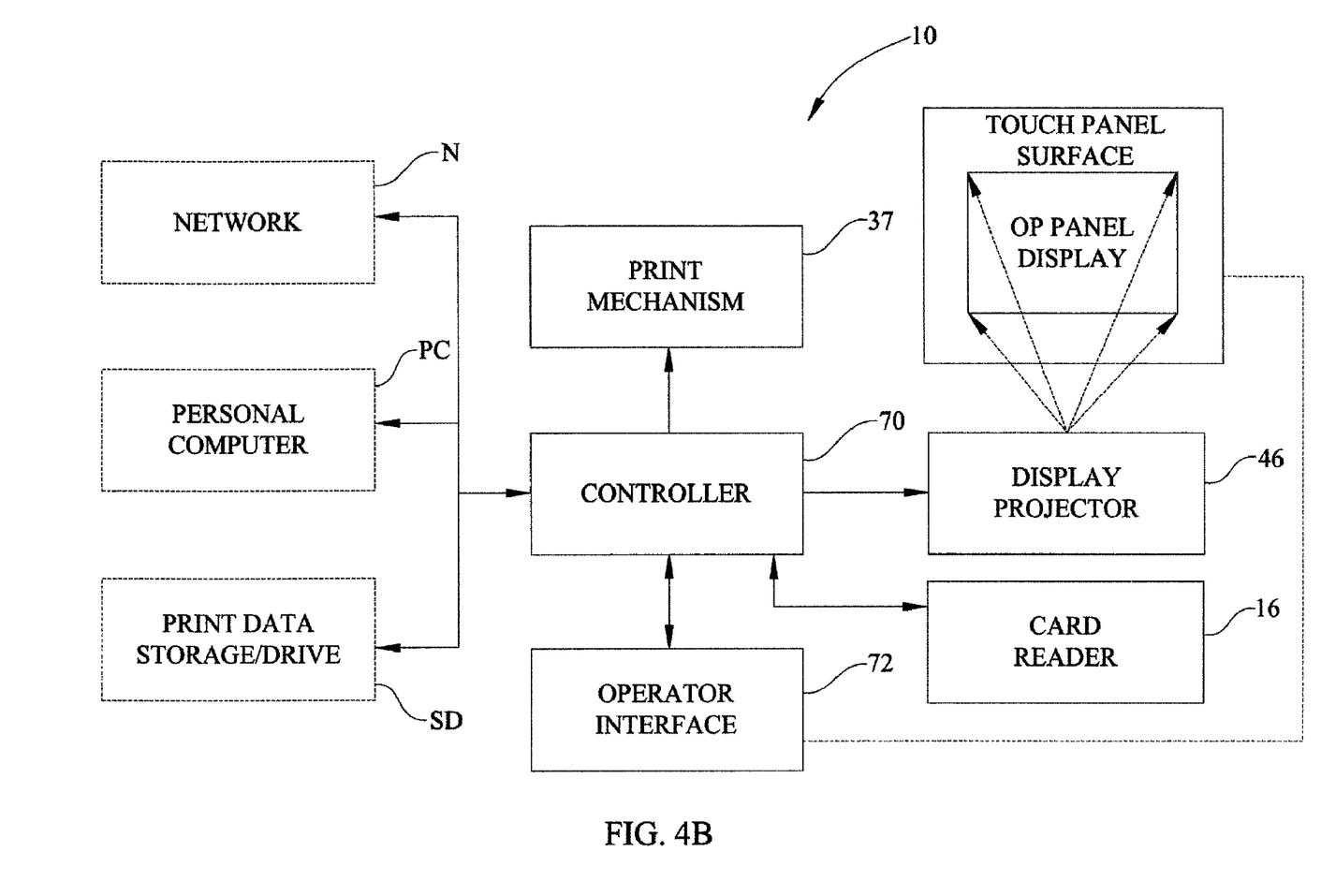
FIG. 4b depicts a schematic diagram of the peripheral device of FIG. 1 with a touch panel display surface.

Additionally, the peripheral device 10 may comprise a memory card reader station 16. The memory card reader station 16 is the buttons 18 of the control panel. The memory card reader 16 receives various types of memory cards which may store picture files for printing or other manipulation by the device 10. These include USB flash drives, Secure Digital (SD) cards, micro SD cards, Sony® memory stick devices and the like. The media card reader station 16 receives various media types having images located thereon desired for printing. As additional memory devices and formats are continually improving the field of electronic device storage, it is contemplated that the memory card reader station 16 may be adapted to receive various types of memory devices, which may not be listed herein. The images may be displayed on a peripheral device monitor or a monitor connected to a personal or networked computer and may subsequently be edited or formatted as desired and printed through printer portion 20, saved to memory card at reader 16, to a computer or to a network storage device such as storage device SD or a storage card in card reader station 16 (FIG. 4). As shown in FIGS. 4a, 4b, the peripheral device 10 may be remotely connected to a storage device SD which may read, record and be accessible for retrieval of a plurality of machine readable formats and alternatively, or in combination, may also be in data communication with a storage card in card reader station 16.

Figure 3:
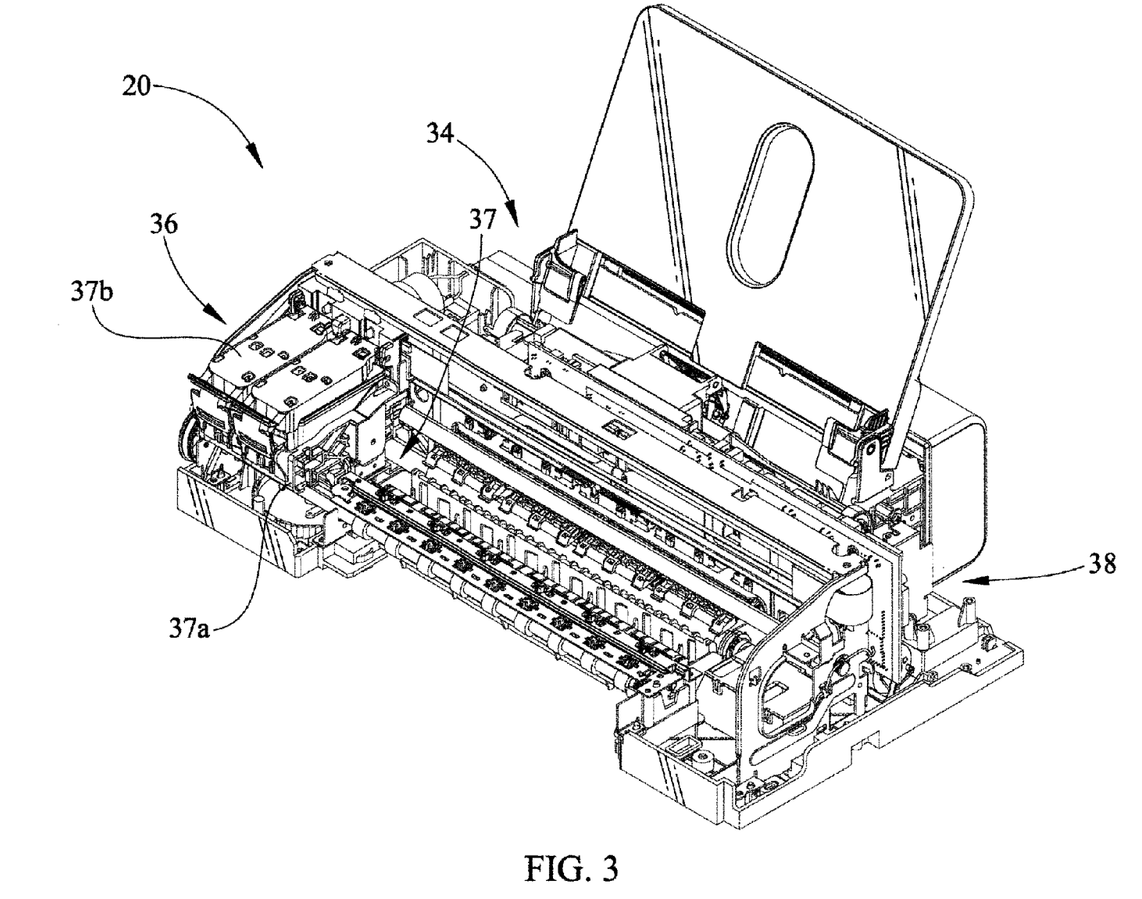
FIG. 3 depicts a perspective view of a print engine.

Extending through the device 10 is a media feedpath 21 which begins at an upper input tray or paper support 22 and extends inwardly through the housing 12 adjacent the carrier assembly 36 (FIG. 3). The media feedpath 21 further extends through the printer housing 12 to a front position of the housing 12 at the exit tray 24. In this exemplary L-shaped path, the upper tray 22 is generally upwardly directed while the lower output tray 24 is substantially horizontally extending from the housing 12. The upper input tray 22 may be pivotally connected such that it folds downwardly over the housing 12 when the printer is not in use. Likewise, the exit tray 24 may be slideably positioned within the housing so that the tray 24 may be retracted when the printer is not in use. Alternatively, a C-shaped feedpath may be utilized wherein both the input tray and exit tray are located below the print mechanism.

Referring now to FIGS. 1-3, the housing 12 covers a print engine 20 which is defined by at least a paper feed assembly 34 enabling feeding of media M, and may further comprise a carrier assembly 36 and a tray base 38. The carrier assembly 36 may comprise a print mechanism 37 having a carrier 37a and a print cartridge 37b. The controller 70 (FIG. 4) also directs the print or carrier assembly 36 mounted adjacent to the media feed assembly 34. A slide bar or slide rail extends between ends of the carrier assembly 36 to slidably support a carriage 37a. The slide rail extends substantially transverse to the media feedpath 21 (FIG. 1) so that the carriage 37a may slide in a direction also substantially transverse to the feedpath 21, extending from the input support tray 22 through the housing 12 to the exit tray 24. The carrier assembly 36 may also utilize a feedback loop, as will be understood by one skilled in the art to continually ascertain the position of the carrier 37a on the slide rail and signal controller 70. The carriage 37a houses at least one cartridge 37b containing ink and a printhead for selectively ejecting ink onto media passing in a print zone defined beneath the carriage 37a and within the body 12. According to the exemplary embodiment, the carriage 37a houses two cartridges one for color printing, containing for example, cyan, magenta and yellow color inks as well as a second cartridge which may contain black ink for printing text gray-scale and non-color documents. In an alternate embodiment, ink may be supplied to the printhead on the carriage 37a from an ink cartridge that is remotely positioned from the carriage 37a.

The media feedpath 21 passes through the print engine 20 so that the printhead selectively ejects ink droplets on the media M forming an image thereon. Media M is shown depicted in the input tray 22. The media M feeds from the input tray 22 through the printer housing 12 and to the output tray 24. The upper portion of the printer housing 12 includes an access door 30 which opens to provide access to the carrier assembly 36 for changing print cartridges 37b according to the exemplary embodiment. However, as previously described, alternative print mechanisms, such as, dot matrix, dye sublimation, laser, and any other suitable print formats may be utilized.

On the upper portion of the housing 12 is a projector assembly 40 which provides a projection operations panel on a surface for reviewing images, editing images, and verifying the status of peripheral 10, making user selections, correcting error conditions and the like. The operations panel provided by the projection display may allow for various parameter adjustments. For example, the parameters may be chosen from brightness, contrast, cropping scaling (for example, from legal to letter size), and image translation or movement within the boundary of the media for printing. Other variations may be available to one of ordinary skill in the art depending on the functionality desired, such as red-eye reduction and the like. The operations panel may also allow for selection, of images or menu options, through hardware buttons or virtual buttons on the display as well as cursor movement arrows to move a cursor about the display.

In the exemplary embodiment, the assembly 40 is positioned on the access door 30 however, the projector assembly 40 may be positioned at various locations of the housing 12 and should not be considered limited to the upper portion or the access door 30. The assembly 40 comprises a projector door 42 which is depicted in an open position in FIG. 2. The projector door 42 covers a projector opening 44 in the access door 30. The door 42 may be spring biased to move to an open position and may be manually opened or may be opened electronically through the use of a motorized mechanism. Within the opening 44 and beneath the projector door 42 is a projector 46. However, it is not necessary to utilize a projector door 42 since an opening 44 may be utilized with the projector 46 disposed below. The projector 46 is shown forming an image on the media M inserted in the input tray 22. The image may correspond to menu selections, choices, or images which may be desirable for editing and/or printing and therefore defining an operations panel. The control buttons 18 on the housing 12 may be utilized to make selections corresponding to menu selections displayed by the projector 46. Alternatively, selections may be made utilizing a touch panel, a touchpad, a trackball, a mouse or other operator input device. In either event, the peripheral 10 may be controlled by the operator utilizing the displayed image from projector 46.

Referring now to FIGS. 4a, 4b, schematic diagrams of the peripheral 10 are depicted wherein FIG. 4a depicts a device which projects an image and FIG. 4b depicts a device which projects an image on to an operations or touch panel for receiving input by a user. With reference first to FIG. 4a, the peripheral 10 comprises various components including a print controller 70, a print mechanism 37, an operator interface 52 and the projector 46. The schematic also depicts communication between the peripheral 10 and a network N, a personal computer PC and a storage drive SD. As previously indicated, such communication may be by wired or wireless communication link. The print controller 70 controls operation of the peripheral 10. The projector 46 receives signals from the controller 70 which may include a video out capability for communication to the projector 46 of the peripheral 10. The operator interface 72 may be located on firmware either onboard or remote from the controller 70. The projector 46 is also in communication with the controller 70 and receives signals initiated from the operator interface 72 for display by the projector 46. According to FIG. 4b, the projector 46 signals the user by displaying the operations display panel generated by the operator interface 72 and communicated to the controller 70. The communication between the operator touch panel and the interface 72 is indicated by a broken line. When inputs are received at the touch panel, such input is communicated from the operator interface 72 to the controller 70 resulting in some action by the device 10. The controller 70 may be embodied by a microprocessor which includes an integral video control or which communicates with a separate video control for the projector 46. In either event, the projector 46 receives a signal from the controller so that menus, images for editing or printing, virtual buttons or the like may be projected on to a surface. Such projection of an operations panel allows for a larger operations panel than previously available as well as removal of smaller displays which may have been used in prior art peripherals. Further the projector 46 may be utilized to display images, such as PowerPoint® presentation slides and such slides may conveniently be printed during the presentation using the print mechanism 37. Additionally, where a scanner is implemented into the peripheral, for example in an all-in-one peripheral, scanned images may be projected for editing, printing or confirmation to save to a drive location or other storage SD, 16.

Figure 5:
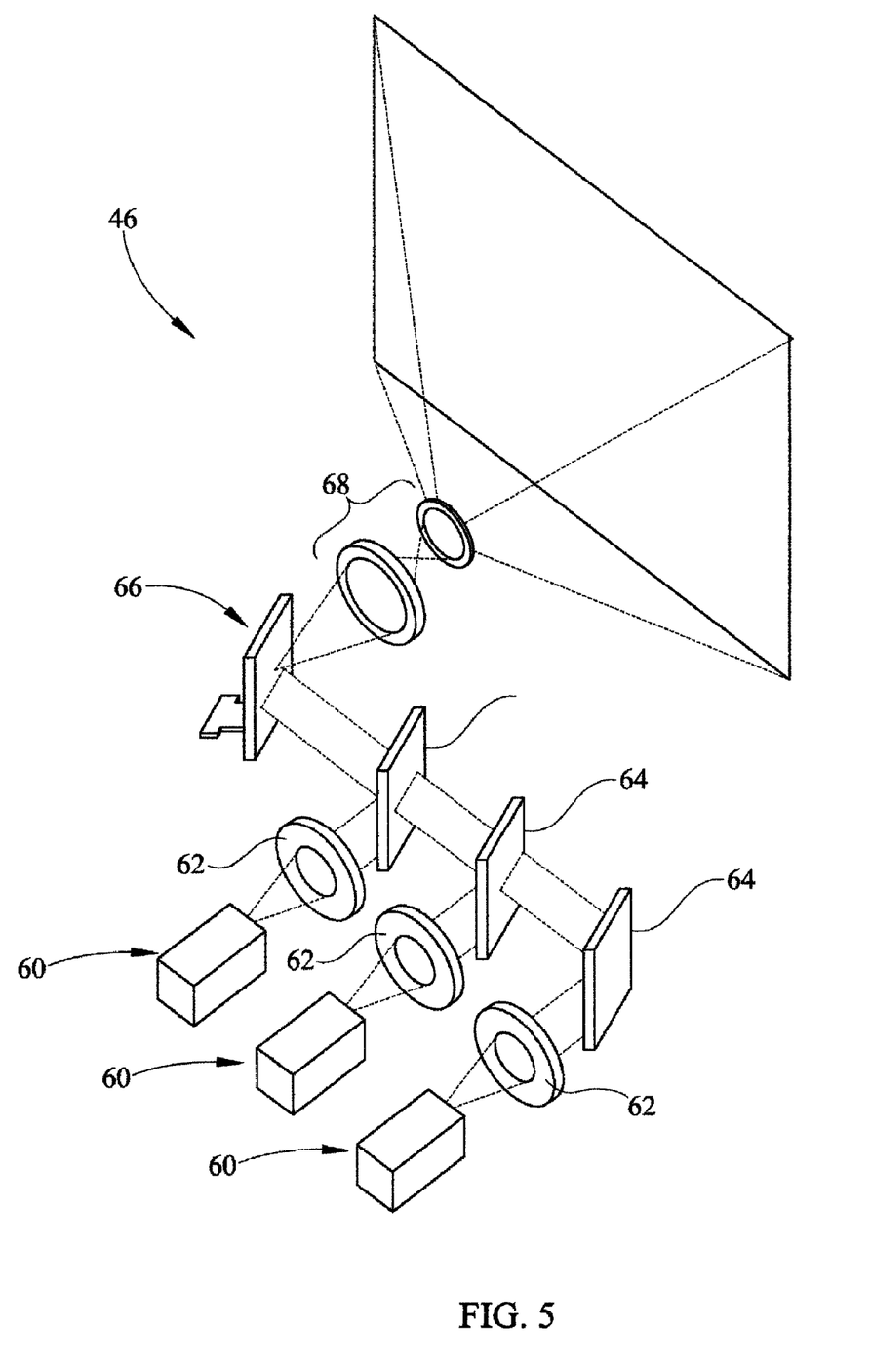
FIG. 5 depicts a schematic view of an exemplary projection engine.

Referring now to FIG. 5, a perspective view of an exemplary projector or projection engine 46 is depicted. The projection engine 46 may provide a color image, monochrome image or both on a display surface and define an operations panel. Although various projection engines may be utilized, one exemplary projector which may be suitable for the present embodiment may be a miniature Liquid Crystal on Silicon (LCoS) projection system of the type made by Light Blue Optics Ltd. of Cambridge, UK. The exemplary projector 46 may be holographic laser projection technology which is low cost, compact, has low power consumption, no moving parts, wide throw angles and remains in focus at all distances. The term "holographic" refers not to the projected image, but to the method of projection. The exemplary system, described here in general terms, utilizes a plurality of light sources 60. According to the exemplary system the light sources are lasers generating three colors red, green and blue, respectively. Alternatively, the laser source 60 may be a light emitting diode (LED) source, or a non-infrared laser light source such as a neon laser, argon laser, or carbon dioxide laser. The light generated by sources 60 passes through collimating lenses 62 which render the light rays parallel. After passing through the collimating lenses 60, the light engages mirrors 64 to direct the light to a light crystal valve or microdisplay 66 formed of LCoS. A diffraction pattern of the desired 2D image, calculated using known holographic algorithms, is displayed on a phase-modulating LCoS microdisplay or liquid crystal light valve 66. When illuminated by coherent laser light, the desired image is projected.

Rather than blocking light, the phase-modulating LCoS microdisplay 66 steers the light to exactly where it is needed, making the system highly efficient. Unlike conventional projection systems, the projector 46 may not require a projection lens. Instead, a demagnification lens pair 68 expands the diffracted image from the microdisplay 66, producing an ultra-wide throw angle greater than ninety degrees (90°). The projected images are in focus at all distances from the projector, eliminating the need for a focus control. The diffractive method of projection naturally lends itself to miniaturization and low cost implementation. It allows images to be projected onto curved and angled surfaces without distortion, and is highly tolerant to microdisplay pixel failure.

Alternatively, other known projection technologies may be utilized such as digital light processing (DLP) technology (not shown), LCD or other known or unknown projection technologies which may be affordably implemented into the peripheral 10 to provide a projected operations panel. For example, a DLP includes a plurality of individually controllable micro-mirrors. A light source reflects on a first mirror to the DLP and projects an image through a lens. The light may move to one or more mirrors and on to a projection screen.

Figure 6:
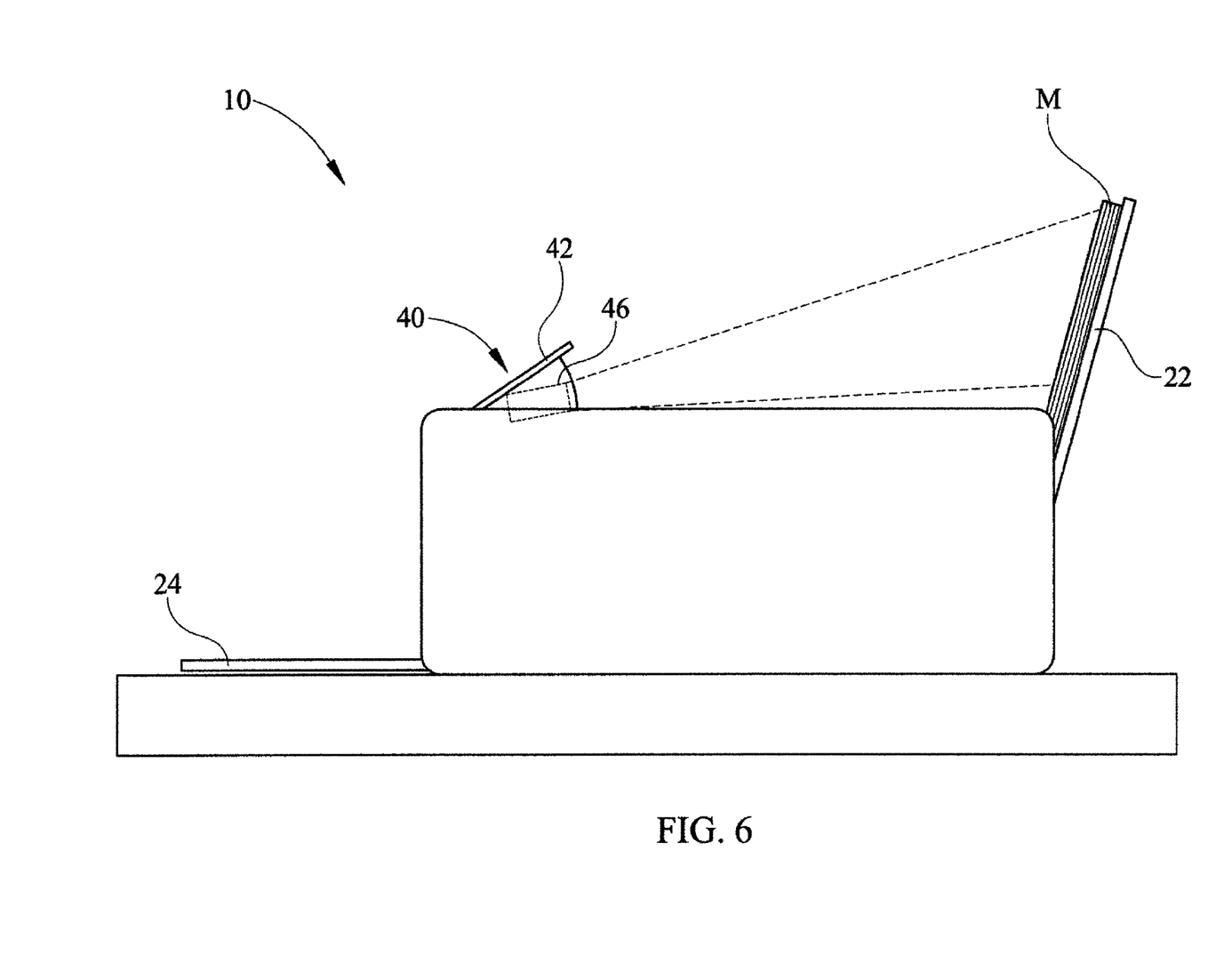
FIG. 6 depicts a side view of the peripheral of FIG. 2.

Referring now to FIG. 6, the peripheral 10 is depicted in side view. The projector door 42 is in an open position and the projector 46 is aimed upwardly toward the media M. In the embodiment depicted, the projector 46 may move to the preselected angle depicted in order to project an image on the media M when the projector door 42 raises. Alternatively, as will be described further herein, the projector 46 may have pivoting capability independent of the door 42 motion.

Figure 7:
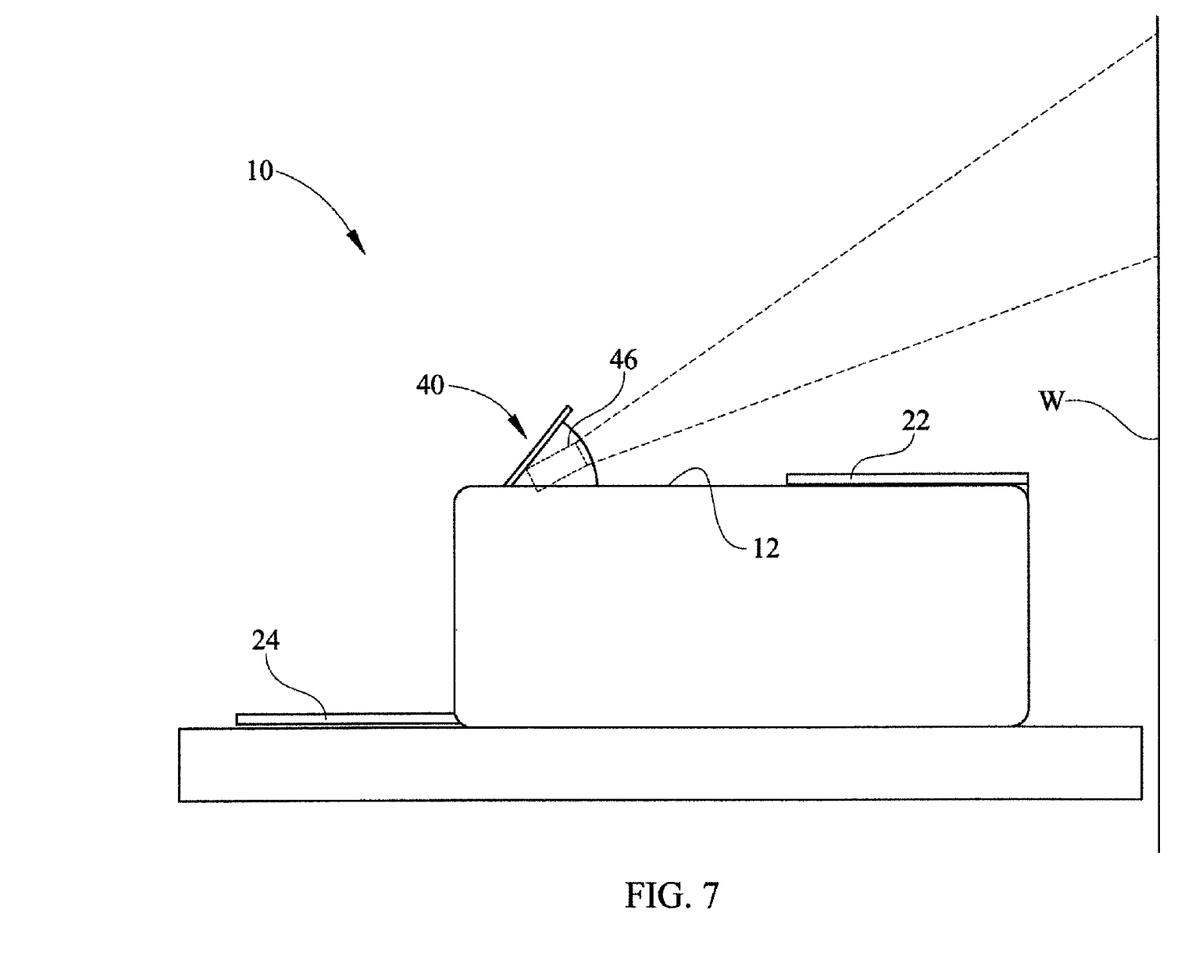
FIG. 7 depicts a side view of an alternative embodiment of the peripheral of FIG. 2.

Referring now to FIG. 7, the peripheral 10 is depicted in side view. The projector 46 is shown pivoted from its position in FIG. 6, so that the operations panel display is directed toward a wall W positioned adjacent the peripheral 10. The input tray 22 is also shown folded or pivoted downward against the housing 12 so as not to interfere with the image being projected against the wall W or other suitable surface. Alternatively, however, the tray 22 may remain in an upright position and the projector 46 may be aimed at such an angle so that the input tray 22 does not interfere with the projected image. In order to provide the aiming ability, the projector assembly 40 may include various pivoting mechanisms, such as a ball and socket joint, a universal joint or two separate adjustable joints, allowing movement of the projector 46 through a horizontal axis or a vertical axis, if such pivoting is desirable. The pivoting motion may be manually performed through movement of a gear assembly or alternatively may be automated through use of a power transmission and motor or the like. In any event, the projector 46 depicts an image on the wall W so that a user may view images, see menus, make selections, edits and the like thereupon.

Figure 8:
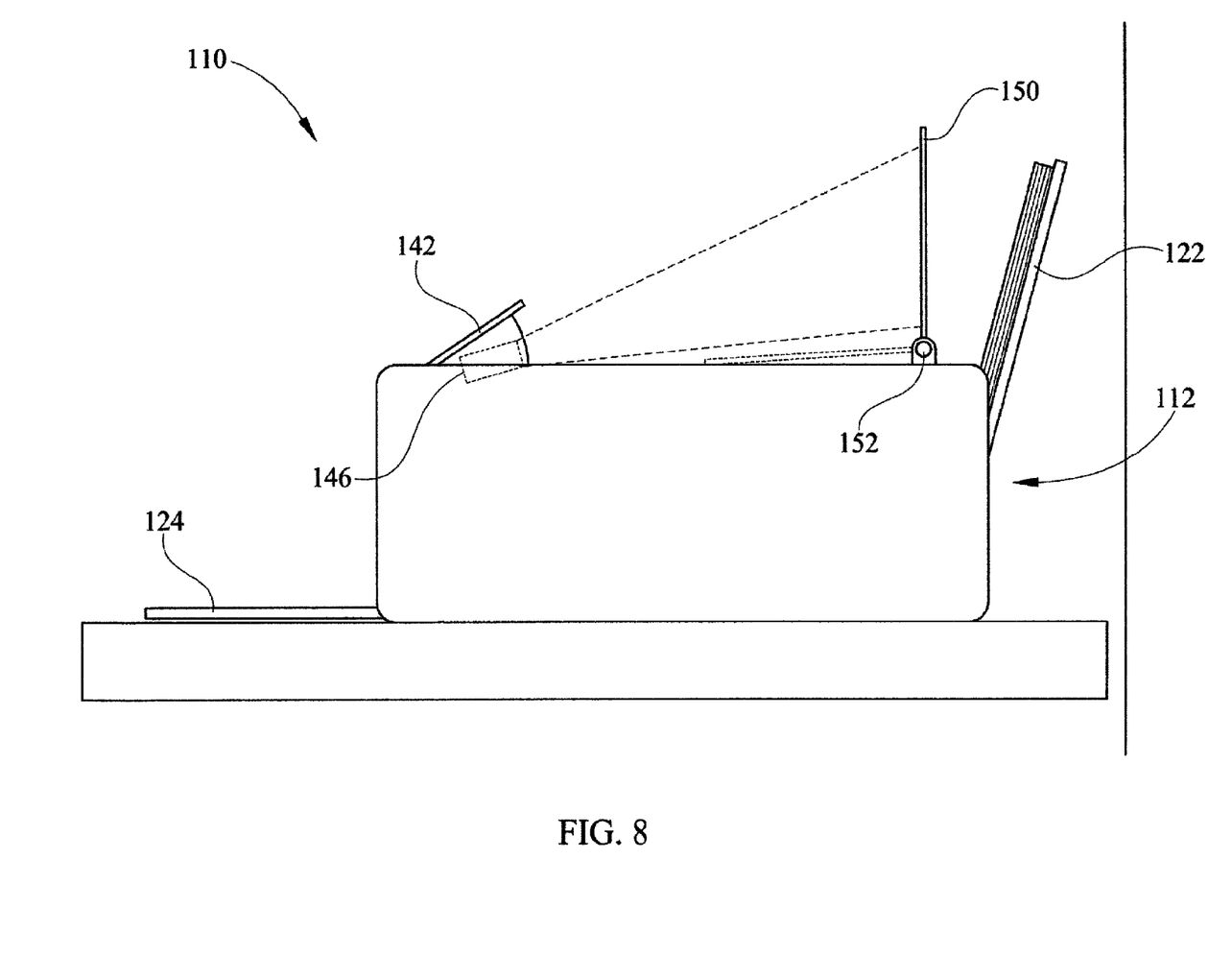
FIG. 8 depicts an alternative peripheral embodiment having a front projection design and on-board screen; and, FIG. 9 depicts an alternative peripheral embodiment having a rear projection and on-board screen.

Referring now to FIG. 8, an alternative peripheral 110 is depicted in side view. The peripheral 110 includes a projector 146 disposed beneath a projector door 142. The projector 146 is a front projection device which displays an image on a display screen 150. The display screen 150 is connected to a pivot base 152 allowing for pivotal motion of the display screen when it is not in use. The lower position of the display screen 150 is depicted in broken line. The display screen 150 may comprise matte white, high contrast matte white, silver matte, grey matte, glass beaded, high contrast cinema and or perforated finishes, and may be formed of vinyl or other washable, stain resistant and/or flame resistant materials. The screen may be made of fabric covered material or may be a solid material mounted on or pivotally connected to the housing 112. Such solid material may include vinyl, polyester, polycarbonate, acrylic materials or other polymeric materials.

Figure 9:
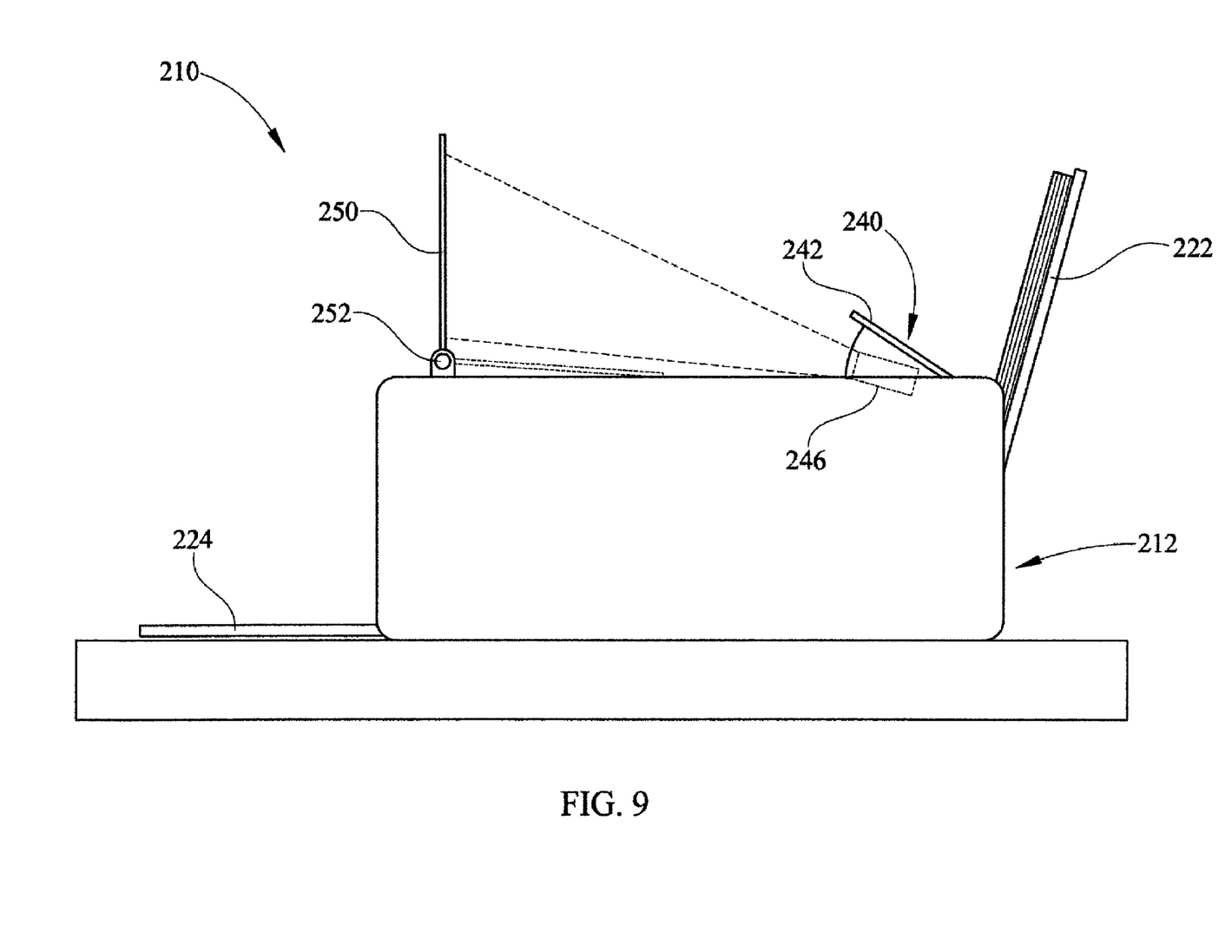

Alternatively, as shown in FIG. 9, a rear projection system is depicted having a projection screen 250 pivotally connected to a pivot base 252. The projector 246 is shown projecting an image on the screen 250 from a rear side of the screen 250. Once the user makes selections on the operations panel, that is the screen 250 with the projected image thereon, the screen 250 may be pivoted downwardly and out of the way. Such motion may also flag a sensor which lowers the projection door 242 so that the light projection does not harm a user. Due to the assembly 240 being positioned behind the screen, from the user's point of view, the screen material 250 may be formed of acrylic gray or acrylic clear, polycarbonate clear, polyester clear or some other material allowing proper imaging from rearwardly positioned projection engine 246.

In any of the projection systems previously described, the screens 150,250 may allow for touch display control to provide the virtual buttons previously described. The touch display allows for user input when the user touches the screen or display. The touch screen, in combination with the display, defines an operations panel allowing the user to view images, edit images, and generally control peripheral functions. Such function may be performed with or without connection to a personal computer. In other words, the peripheral may be a stand-alone device. The information provided for selection and input is generated by the operator interface 72 and is displayed on the touch display 150, 250. The touch displays 150, 250 may be utilized to make inputs into the peripheral as opposed to or in combination with buttons 18, a mouse and/or keyboard (not shown) which may be connected via a USB or other connection means with the peripheral. The touch input system operates by utilizing at least one screen overlay on the screen 150,250 which receives a signal when a user touches screen 150, 250. There are at least three basic systems that are used to recognize a user's touch: resistive, capacitive and surface acoustic wave. The resistive system consists of a normal glass panel that is covered with a conductive and a resistive metallic layer. These two layers may be held apart by spacers, and a scratch-resistant layer is placed on top of the assembly. An electrical current runs through the two layers while the monitor is operational. When a user touches the screen, the two layers make contact at the location of the input force. The change in the electrical field is noted and the coordinates of the point of contact are calculated by the computer. Once the coordinates are known, a driver translates the touch into an input that the operating system can understand, much as a computer mouse driver translates a mouse's movements.

In the capacitive system, a layer that stores electrical charge is placed on the glass panel of the monitor. When a user touches the monitor with his or her finger, some of the charge is transferred to the user, so the charge on the capacitive layer decreases. This decrease is measured in circuits located at each corner of the monitor. The computer calculates, from the relative differences in charge at each corner, exactly where the touch event took place and then relays that information to the touchscreen driver software. One advantage that the capacitive system has over the resistive system is that it transmits almost 90 percent of the light from the projector, whereas the resistive system may only transmit about 75 percent. This gives the capacitive system a clearer picture than the resistive system.

In the screen of a surface acoustic wave system, two transducers (one receiving and one sending) are placed along the x and y axes of the screen 150, 250. Reflectors are placed on the screen 150, 250 which reflect an electrical signal sent from one transducer to the other. The receiving transducer is able to tell if the wave has been disturbed by a touch event at any instant, and can locate it accordingly. The wave setup has no metallic layers on the screen, allowing for 100 percent (%) light throughput and outstanding image clarity. This makes the surface acoustic wave system best for displaying detailed graphics (both other systems have significant degradation in clarity).

Another area in which the touch systems differ is in which stimuli will register as a touch event. A resistive system registers a touch as long as the two layers make contact, which means that it does not matter if a user touches the panel with a finger or for example a rubber eraser on the end of a pencil. A capacitive system, on the other hand, must have a conductive input, usually a finger, in order to register a touch. The surface acoustic wave system works much like the resistive system, allowing a touch with almost any object, except hard and small objects like a pen tip. Further, the resistive system is the typically the least expensive, its clarity is the lowest of the three, and its layers can be damaged by sharp objects. The surface acoustic wave setup is currently and usually the most expensive. Additionally, any of the touch display systems may be incorporated or fitted on to a wall where the peripheral 10 may display the projection 46 output. Although the previous touch descriptions are provided, alternative systems may be implemented by one skilled in the art and therefore should be considered within the ambit of a skilled artisan.

The foregoing description of the various embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A device, comprising:
a printer portion;
a media feedpath extending through said printer portion having a media input and a media output;
a controller coupled to the printer portion; and
an image projector projecting an image towards said media input, said controller being coupled to and controlling said image projector such that said image projected defines at least a portion of an operations panel for the printer portion for making operation selections.

2. The device of claim 1 wherein said device is a stand-alone device.

3. The device of claim 1 wherein said device includes a port for connecting to a host computer.

4. The device of claim 1 wherein said device is a single function peripheral.

5. The device of claim 1 wherein said device is a multi-function peripheral.

6. The device of claim 1 wherein said image projector comprises a rear projection image projector.

7. The device of claim 1 wherein said image projector is moveable from a first stored position to a second operating position.

8. An apparatus, comprising:
a printer portion, the printer portion including a media input for receiving sheets of media;
a controller coupled to the printer portion; and
an image projector mounted to said apparatus, said controller coupled to and controlling said image projector such that images projected by said image projector form at least part of an operations panel for operating said printer portion, said images projected by said image projector being projected towards said media input.

9. The apparatus of claim 8, said image projector being movable from a first stored position to a second operating position.

10. The apparatus of claim 8 wherein said image projector is a rear projection display.

11. The apparatus of claim 8 wherein said image projector is a front projection display.

12. The apparatus of claim 8 wherein said apparatus is a stand-alone apparatus.

13. The apparatus of claim 12 wherein said apparatus is a single function apparatus.

14. The apparatus of claim 12 wherein said apparatus is an all-in-one apparatus.

15. A device, comprising:
a printer mechanism for printing on sheets of media;
a controller coupled to said printer mechanism;
a projection engine coupled to said controller for projecting a display image; and
a housing in which said printer, said controller and said projection engine are disposed;
said display image forming at least part of an operations panel for operating said printer, including at least one of menu selections and image editing.

16. The device of claim 15 wherein said projection engine is a rear projection projector.

17. The peripheral device of claim 15 wherein said projection engine has a projection assembly having a projection door which is selectively raised and lowered.

18. The device of claim 1, wherein said image projector projects said image on said media input in absence of a sheet of media being received therein.

19. The device of claim 1, further comprising:
a housing in which at least part of said printer portion, said media feedpath, said controller and said image projector are disposed;
at least one replaceable item disposed in said housing for use by said printer portion; and
a first door coupled to said housing for providing access to said at least one replaceable item, said image projector being disposed beneath said first door.

20. The device of claim 19, further comprising a second door coupled to said first door, said second door being in an open position when said image projector projects said image.

21. The device of claim 8, wherein said images are projected on said media input when said media input is empty and on said sheets of media when received in said media input.

22. The device of claim 8, wherein said images are projected on said media input.

23. The device of claim 8, further comprising:
a housing in which at least part of said printer portion, said controller and said image projector are disposed;
at least one replaceable item disposed in said housing; and
a first door coupled to said housing for providing access to said at least one replaceable item, said image projector being disposed beneath said first door.

24. The device of claim 23, further comprising a second door coupled to said first door, said second door being in an open position when said image projector projects said image.

25. The device of claim 15, wherein said display image is projected on an input media stack.

26. The device of claim 15, further comprising a media input for receiving a stack of media, said projection engine projecting said display image towards said media input.

27. The device of claim 26, wherein said display image is projected on one of said stack of media and said media input.

28. The device of claim 25, further comprising:
a housing in which at least part of said printer mechanism, said controller and said projection engine are disposed;
at least one replaceable item disposed in said housing for use by said printer mechanism for printing on said sheets of media; and
a first door coupled to said housing for providing access to said at least one replaceable item, said image projector being disposed beneath said first door.

29. The device of claim 28, further comprising a second door coupled to said first door, said second door being in an open position when said projection engine projects said display image.

30. The device of claim 1, wherein said image is projected on said media input.

* * * * *